United States Patent
Hosokawa et al.

(10) Patent No.: US 9,902,356 B2
(45) Date of Patent: Feb. 27, 2018

(54) VEHICULAR OCCUPANT DETERMINATION APPARATUS

(71) Applicants: DENSO CORPORATION, Kariya, Aichi-pref. (JP); HONDA MOTOR CO., LTD., Minato-ku, Tokyo (JP)

(72) Inventors: Toshio Hosokawa, Kariya (JP); Yusuke Muramatsu, Wako (JP)

(73) Assignees: DENSO CORPORATION, Kariya, Aichi-pref. (JP); HONDA MOTOR CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/189,729

(22) Filed: Jun. 22, 2016

(65) Prior Publication Data

US 2016/0375850 A1    Dec. 29, 2016

(30) Foreign Application Priority Data

Jun. 24, 2015    (JP) ................ 2015-126424

(51) Int. Cl.
- *B60R 21/00* (2006.01)
- *B60R 21/015* (2006.01)
- *B60N 2/00* (2006.01)

(52) U.S. Cl.
CPC ........ *B60R 21/01516* (2014.10); *B60N 2/002* (2013.01); *B60R 21/01556* (2014.10)

(58) Field of Classification Search
None
See application file for complete search history.

(56) References Cited

U.S. PATENT DOCUMENTS

| | | | |
|---|---|---|---|
| 2004/0045759 A1 | 3/2004 | Kiribayashi | |
| 2012/0312604 A1 | 12/2012 | Fujii | |
| 2014/0297214 A1* | 10/2014 | Muramatsu | ......... B60R 21/0155 702/101 |
| 2015/0166000 A1* | 6/2015 | Honda | .................... B60R 22/48 701/45 |
| 2016/0096498 A1* | 4/2016 | Kubota | ............. B60R 21/01546 73/1.15 |

FOREIGN PATENT DOCUMENTS

| | | |
|---|---|---|
| JP | 2000-302003 A | 10/2000 |
| JP | 3726276 B2 | 12/2005 |

OTHER PUBLICATIONS

U.S. Appl. No. 15/189,608, filed Jun. 22, 2016, Hosokawa et al.

* cited by examiner

*Primary Examiner* — James M McPherson
(74) *Attorney, Agent, or Firm* — Knobbe, Martens, Olson & Bear, LLP

(57) ABSTRACT

A vehicular occupant determination apparatus includes a load detection portion, an occupant determination portion, an acceleration detection portion, a transition prohibition portion, and a transition permission portion. The transition permission portion detects whether an acceleration increases or decreases a load, and sets a transition permission state even during the transition prohibition state. In the transition permission state, a determination result of a first occupant type is permitted to transit to a determination result of a second occupant type with a smaller load than the load of the first occupant type when the acceleration increases the load, and the determination result of the first occupant type is permitted to transit to a determination result of a third occupant type with a greater load than the load of the first occupant type when the acceleration decreases the load.

4 Claims, 13 Drawing Sheets

VEHICULAR OCCUPANT DETERMINATION APPARATUS

CROSS REFERENCE TO RELATED APPLICATION

This application is based on Japanese Patent Application No. 2015-126424 filed on Jun. 24, 2015, the disclosure of which is incorporated herein by reference.

TECHNICAL FIELD

The present disclosure relates to a vehicular occupant determination apparatus that determines a type of an occupant on a vehicle seat.

BACKGROUND

Patent literature 1: JP 2013-001152 A (corresponding to US 2012/0312604 A)

For example, Patent literature 1 discloses a vehicular occupant determination apparatus which determines a type of an occupant on a vehicle seat in order to operate an occupant protection apparatus such as an airbag apparatus, a seatbelt pre-tensioner. In order to determine whether the occupant protection apparatus operates or not, this kind of the occupant determination apparatus determines which situations including a case where (i) there is nothing on a vehicle seat (also, referred to as a vacant seat, or vacant), (ii) a child restraint systems (also referred to as a car seat) is leashed, (iii) a small-sized adult has a seat, or (iv) a large-sized adult has a seat. Hereinafter, by including the above situations regarding the vehicle seat determined by the occupant determination apparatus, the situations are named as a type of an occupant (hereinafter, also referred to as an occupant type).

In an occupant determination apparatus disclosed conventionally, a pair of front and rear load sensors is provided at a left-side support portion of the vehicle seat. And, based on a detection value of the load sensors, the occupant type on the vehicle seat is determined. In addition, the occupant determination apparatus determines the occupant type only when the detection value of an acceleration sensor which detects an acceleration of a lateral direction (also referred to as a vehicle width direction) of a vehicle is equal to or less than a predetermined threshold. That is, in a vehicle, the determination of the occupant type is not performed when the acceleration in the vehicle width direction exceeds the threshold. An occupant position or an occupant posture on the vehicle seat may change when acceleration occurs in the vehicle width direction according to a turning driving of the vehicle or the like. In this case, although the occupant type on the vehicular sheet has not changed, it may be determined that the occupant type has changed. According to a conventional occupant determination apparatus, a wrong transition of a determination result of the occupant type due to the acceleration generated in the vehicle width direction can be prevented.

The inventors of the present application have found the following regarding a conventional occupant determination apparatus. According to the conventional occupant determination apparatus, the occupant type is not determined when the acceleration in the vehicle width direction exceeds a threshold. Thus, when the occupant type on the vehicle seat has changed in actual, the determination of the occupant type may be delayed. Especially, there may be a case where the determination result of the occupant type transits (changes) to a proper determination result with taking a time during driving of the vehicle after the occupant determination which is different from an actual occupant type has been made. Further, there may be a case where the occupant has a seat or leaves a seat in the vehicle during driving. In the cases, the determination result of the occupant type may be required to transit even though the acceleration in the vehicle width direction occurs. The determination of the occupant type, which is different from the actual occupant type, may remain until the vehicle drives a straight road or stops in a flat road, when the determination result of the occupant type does not transit due to the occurrence of the acceleration,

SUMMARY

It is an object of the present disclosure to provide a vehicular occupant determination apparatus that determines an occupant type on a vehicle seat more properly even when acceleration occurs in the vehicle width direction.

According to one aspect of the present disclosure, a vehicular occupant determination apparatus comprising: a load detection portion that detects a load of either a left part or a right part of a seat portion of a vehicle seat in a vehicle; an occupant determination portion that determines any one of occupant types on the vehicle seat based on the load detected by the load detection portion, and maintains or transits a determination result of the occupant types; an acceleration detection portion that detects an acceleration in a width direction of the vehicle; a transition prohibition portion that sets a transition prohibition state when the acceleration is equal to or greater than a predetermined acceleration threshold, wherein the determination result of the occupant types is prohibited to transit in the transition prohibition state; and a transition permission portion that detects whether the acceleration increases or decreases the load, and sets a transition permission state even during the transition prohibition state. In the transition permission state, the determination result of a first occupant type is permitted to transit to the determination result of a second occupant type with a smaller load than the load of the first occupant type when the acceleration increases the load, and the determination result of the first occupant type is permitted to transit to the determination result of a third occupant type with a greater load than the load of the first occupant type when the acceleration decreases the load, the occupant types include the first occupant type, the second occupant type, and the third occupant type.

According to this configuration, when an acceleration detected by the acceleration detection portion is equal to or greater than a predetermined acceleration threshold, a transition prohibition portion sets a transition prohibition state which prohibits a transition of the determination result of the occupant type determined by the occupant determination portion. Accordingly, when a vehicle drives in turning or a vehicle stops inclined in the vehicle width direction, the transition prohibition portion sets the transition prohibition state. Thus, it may be possible to prevent a wrong determination that the occupant type has changed, even when the occupant position or the occupant posture has changed on the vehicle seat. The acceleration detection portion includes the transition permission portion that sets the transition permission state. According to the transition permission portion, when the acceleration increases the load during the transition prohibition state, the determination result toward a greater load side is permitted to transit. When the acceleration decreases the load during the transition prohibition state, the determination result toward a smaller load side is permitted to transit. Accordingly, a transition toward a state where it is less likely affected by an occurrence of the acceleration is permitted such as a direction toward the smaller load side in a case where the acceleration increases the load, a direction toward the greater load side in a case where the acceleration decreases the load. Thus, the transition of the determination result is not prevented substantially, even when the determination result of the occupant type transits to a proper the determination result with taking a time during driving of the vehicle, or even when the occupant has a seat or leaves a seat in the vehicle during driving. Therefore, it may be possible to obtain a determination result, which is at least approximate to an extent which does not effect on an operation of the occupant protection apparatus with respect to the occupant type, as early as possible.

Incidentally, there may be a case where the occupant type on the vehicle seat is not determined exactly when the acceleration occurs in the vehicle. In this case, it may be possible to determine an adjacent occupant type (an approximate occupant type) with respect to an actual occupant type. Accordingly, the operations of the occupant protection apparatus are likely to be similar or common between adjacent types of the occupant, so that a significant difficulty may not occur.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiment (Configuration of Vehicle Seat)

Embodiment of the present disclosure will be explained. In the present disclosure, a case where the detected acceleration is equal to or greater than a predetermined acceleration threshold includes a case where a positive value of the detected acceleration is equal to or greater than a positive value of the acceleration threshold and a case where a negative value of the detected acceleration is equal to or less than a negative value of the acceleration threshold, when the acceleration is distinguished to a positive value and a negative value according to a direction. In other words, a case where the detected acceleration is equal to or greater than a predetermined acceleration threshold includes an absolute value of the detected acceleration is equal to or greater than an absolute value of the accelerated threshold.

A configuration of a vehicle seat 9 of the present embodiment will be explained with reference to FIG. 1. The vehicle seat 9 is mounted to a vehicle VE. In the present application, an occupant type includes concepts of (i) whether or not an occupant BH exists on a vehicle seat 9, (ii) whether or not a child restraint system (CRS) is secured (fixed) on the vehicle seat 9, and (iii) an occupant BH on the vehicle seat 9. The occupant type may also be referred to as a type of an occupant. An example of the occupant is shown in FIG. 3A to FIG. 3D. Also, in the explanation, a front for the occupant BH sitting on the vehicle seat 9 represents a front direction (shown as an arrow in FIG. 1) of the vehicle seat 9. In addition, in the explanation, a right direction when an occupant sits on the vehicle seat 9 and looks at the arrow direction (that is, the front direction) in FIG. 1 corresponds to a right direction. And, a left direction corresponds to the direction opposite to the right direction. An explanation will be provided as if the vehicle seat 9 is a seat for a passenger seat in a right-hand drive vehicle. The present disclosure is not limited to the right-hand drive vehicle. The vehicular occupant determination apparatus 1 (referred to as an occupant determination apparatus 1) in the present disclosure may be applied to a seat for a passenger seat in a left-hand drive vehicle. The vehicular occupant determination apparatus 1 may be applied to any vehicle seat other than the seat for the passenger seat.

Figure 1:
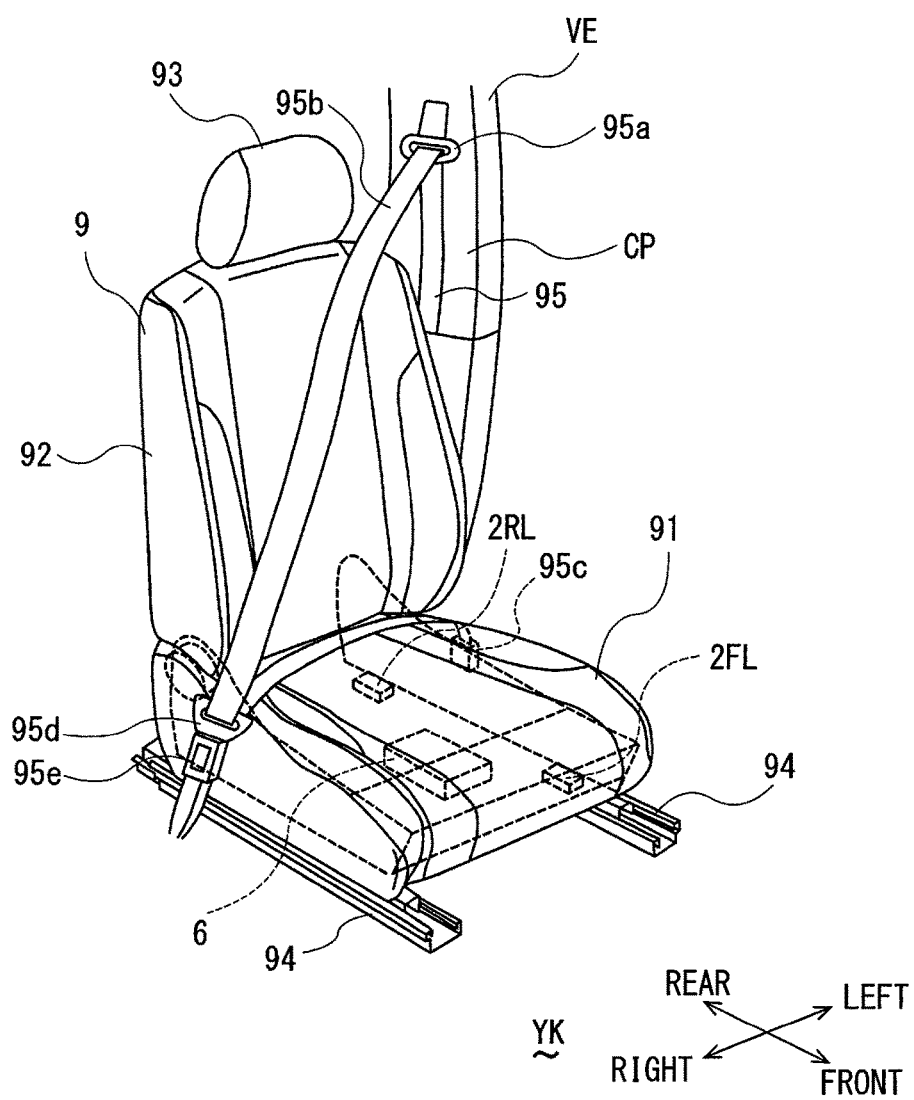
FIG. 1 is a perspective view of a vehicle seat which an occupant type on is determined using a vehicular occupant determination apparatus of an embodiment.

As illustrated in FIG. 1, the vehicle seat 9 for the passenger seat is mounted to the right-hand drive vehicle. The vehicle seat 9 includes a seat cushion 91 (corresponding to a seat part) where an occupant has a seat, and a seat back 92 which is attached rotatably in a front and rear direction at a rear end of the seat cushion 91 and provides a back support for the occupant BH. A head rest 93 which supports a head of the occupant BH is attached at the upper end of the seat back 92. A pair of left and right lower rails 94 is fixed on a floor YK of the vehicle VE. The seat cushion 91 is engaged to the lower rails 94 movably in the front and rear direction.

In the present embodiment, a seatbelt apparatus 95 provided to the vehicle seat 9 is a conventional three-point seatbelt. However, the present disclosure is not limited to a three-point seatbelt. The seatbelt apparatus 95 includes a through anchor 95a which is swingably attached above a center pillar CP of the vehicle VE. A webbing 95b is movably inserted in the through anchor 95a. An outer anchor 95c is fixed to the floor YK so as to be located at the left of the seat cushion 91. One end of the webbing 95b is connected to the outer anchor 95c. The other end of the webbing 95b is drawn into the center pillar CP, and is linked to a retractor (not shown) in the center pillar CP. The webbing 95b is inserted in a tongue plate 95d. The tongue plate 95d is provided to be engageable and demountable with respect to a buckle 95e which is placed at the right of the seat cushion 91. Thus, the seatbelt apparatus 95 is provided so that the occupant BH or CRS is fixed on the vehicle seat 9 with the webbing 95b by engaging the tongue plate 95d to the buckle 95e.

A load sensor 2FL and a load sensor 2RL are attached to the left part of the seat cushion 91. Each of the load sensor 2FL and the load sensor 2RL corresponds to a load detection portion or a load detector. Hereinafter, a load sensor 2FL, 2RL represents the load sensor 2FL and the load sensor 2RL. A pair of the load sensor 2FL, 2RL is attached to a front part and a rear part in the lower part of the seat cushion 91, respectively. The load sensor 2FL is attached to the front part under the seat cushion 91, and the load sensor 2RL is attached to the rear part under the seat cushion 91. The load sensor 2FL, 2RL is formed by a strain gage or the like. The load sensor 2FL, 2RL detects loads W1, W2 that the left part of the seat cushion 91 receives among the load generated by an occupant seating, an attachment of CRS, a loading of a baggage or the like to the vehicle seat 9. Incidentally, the load sensor 2FL detects the load W1. The load sensor 2RL detects the load W2. The load sensor 2FL, 2RL may be attached to the right part of the seat cushion 91. Incidentally, the present disclosure does not limit a class, a type, a detection principle of the load sensor 2FL, 2RL to a specific one.

An occupant detection ECU 6 is placed under the seat cushion 91. The detail of the occupant detection ECU 6 will be explained later.

(Outline Configuration and Function of Vehicular Occupant Determination Apparatus)

An outline configuration of the occupant determination apparatus 1 will be explained with reference to FIG. 2.

An acceleration sensor 3 is formed by an electrostatic capacitance type acceleration sensor, a piezoresistance type acceleration sensor, an acceleration sensor of a heat detection type, or the like. The acceleration sensor 3 detects acceleration GL which is generated in a lateral direction in the vehicle VE. The lateral direction in the vehicle VE is also referred to as the vehicle width direction. The acceleration sensor 3 corresponds to an acceleration detection portion or an acceleration detector.

The load sensor 2FL, 2RL and the acceleration sensor 3 are connected to the occupant detection ECU 6. The occupant detection ECU 6 is a control apparatus which includes an input-and-output device, CPU, RAM, or the like (not shown). The occupant detection ECU 6 includes an occupant determination portion 61 (also referred to as an occupant determiner), a transition prohibition portion 62 (also referred to as a transition prohibition), and a transition permission portion 63 (also referred to as a transition permitter). The occupant detection ECU 6 will be explained in detail.

The occupant determination portion 61 is connected to the load sensor 2FL, 2RL. The occupant determination portion 61 calculates the sum (W=W1+W2) of the load W1, which is detected by the load sensor 2FL, and the load W2, which is detected by the load sensor 2RL. Incidentally, the load W may be an average of the load W1 and the load W2. The load W includes and represents a load W(0) mentioned later, a load W(+GL), and a load W(-GL). The occupant determination portion 61 determines which of the multiple occupant types, based on the calculated load W. The occupant types are determined in advance and represent a type of an occupant on the vehicle seat 9. The occupant determination portion 61 maintains the present determination result of the occupant type, or transits to a newly determined determination result of the occupant type from the present determination result of the occupant type, each time when determining the occupant type on the vehicle seat 9. Incidentally, the present determination result represents a determination result which is a determination result of the occupant type before transition and is presently recognized by the occupant determination portion 61.

Figure 3A:
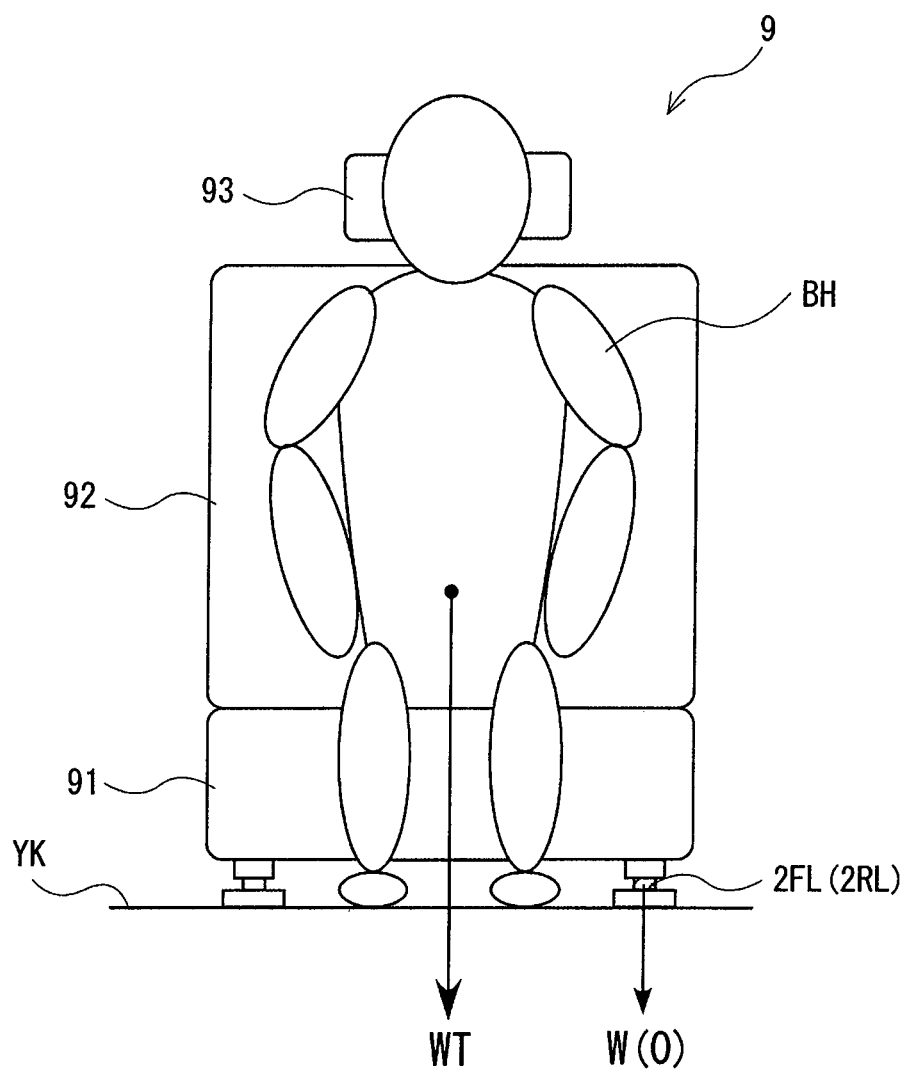
FIG. 3A is an elevation view schematically illustrating a condition where an occupant exists on the vehicle seat illustrated in FIG. 1 and an acceleration does not occur in the vehicle width direction.

As illustrated in FIG. 3A, when an acceleration GL in the vehicle width reaction does not occur to vehicle seat 9, the load sensor 2FL, 2RL detects the load W(0) which is received by the left portion of the seat cushion 91. The load W(0) is generated from the weight WT of the occupant BH. The acceleration GL in the vehicle width reaction is simply referred to as an acceleration GL. The load W(0) is equal to the sum of the load W1, which is detected by the load sensor 2FL, and the load W2, which is detected by the load sensor 2RL.

Figure 3B:
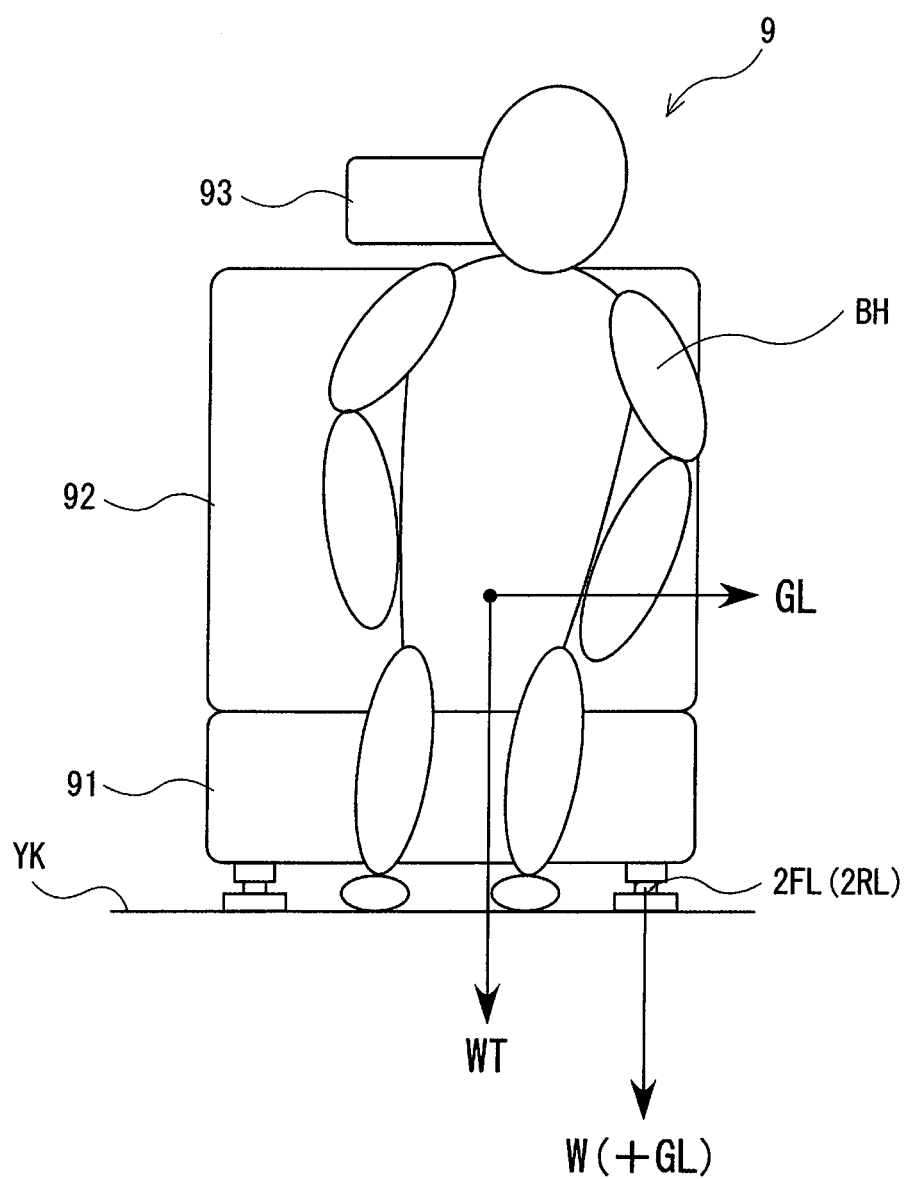
FIG. 3B is an elevation view schematically illustrating a condition where the acceleration occurs in the vehicle width direction.

By contrast, as illustrated in FIG. 3B, the load sensor 2FL, 2RL detects the load W(+GL) when the acceleration GL has occurred in the left direction by turning driving or the like of the vehicle VE with respect to the vehicle seat 9 where the occupant BH exists. The load W(+GL) is equal to the sum of the load W1 and the load W2 in this case. Incidentally, the load W(+GL) is greater than the load W(0), which is detected when the acceleration GL does not occur in the vehicle seat 9, (W(+GL)>W(0)).

Figure 3C:
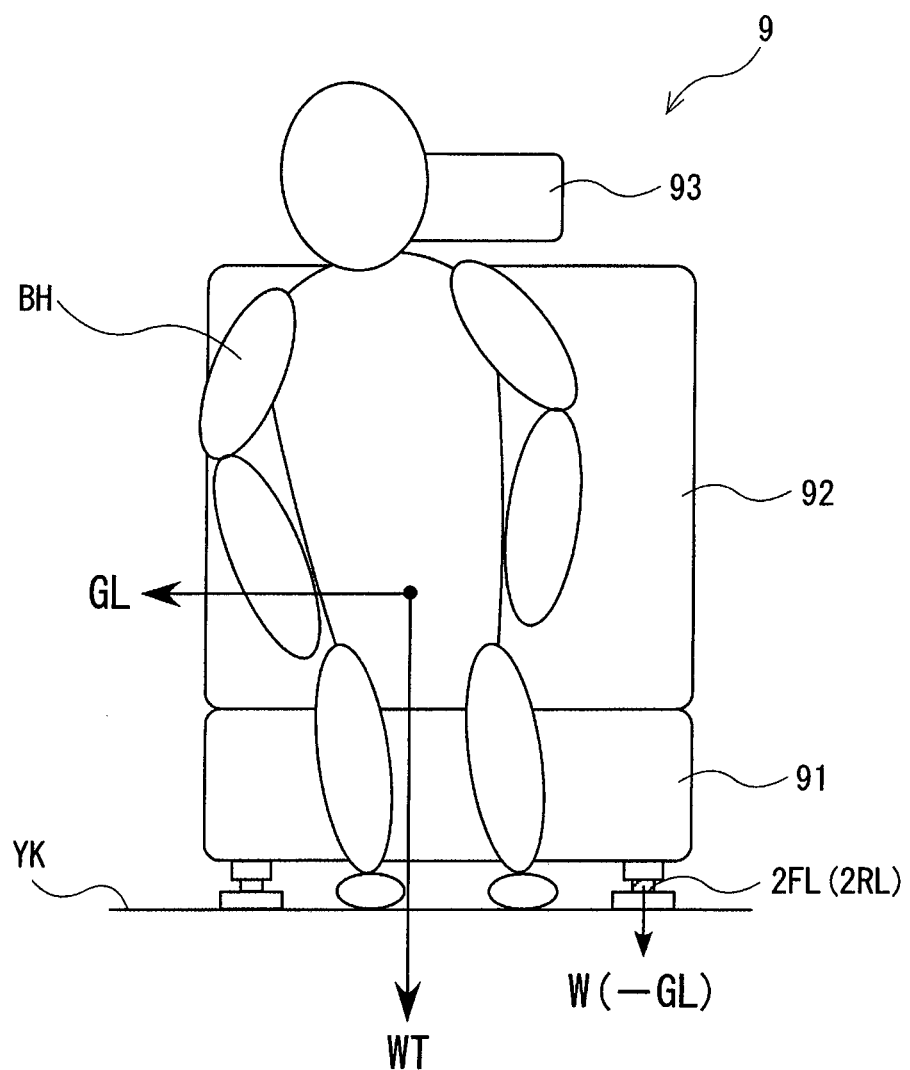
FIG. 3C is an elevation view schematically illustrating a condition where an acceleration occurs in an opposed direction of the acceleration illustrated in FIG. 3B in the vehicle seat.

As illustrated in FIG. 3C, when the acceleration GL occurs in the right direction with respect to the vehicle seat 9, the load sensor 2FL, 2RL detects the load W(-GL). The load W(-GL) is equal to the sum of the load W1 and the load W2 in this case. The load W(-GL) is smaller than the load W(0), (that is, W(-GL)<W(0)).

Figure 3D:
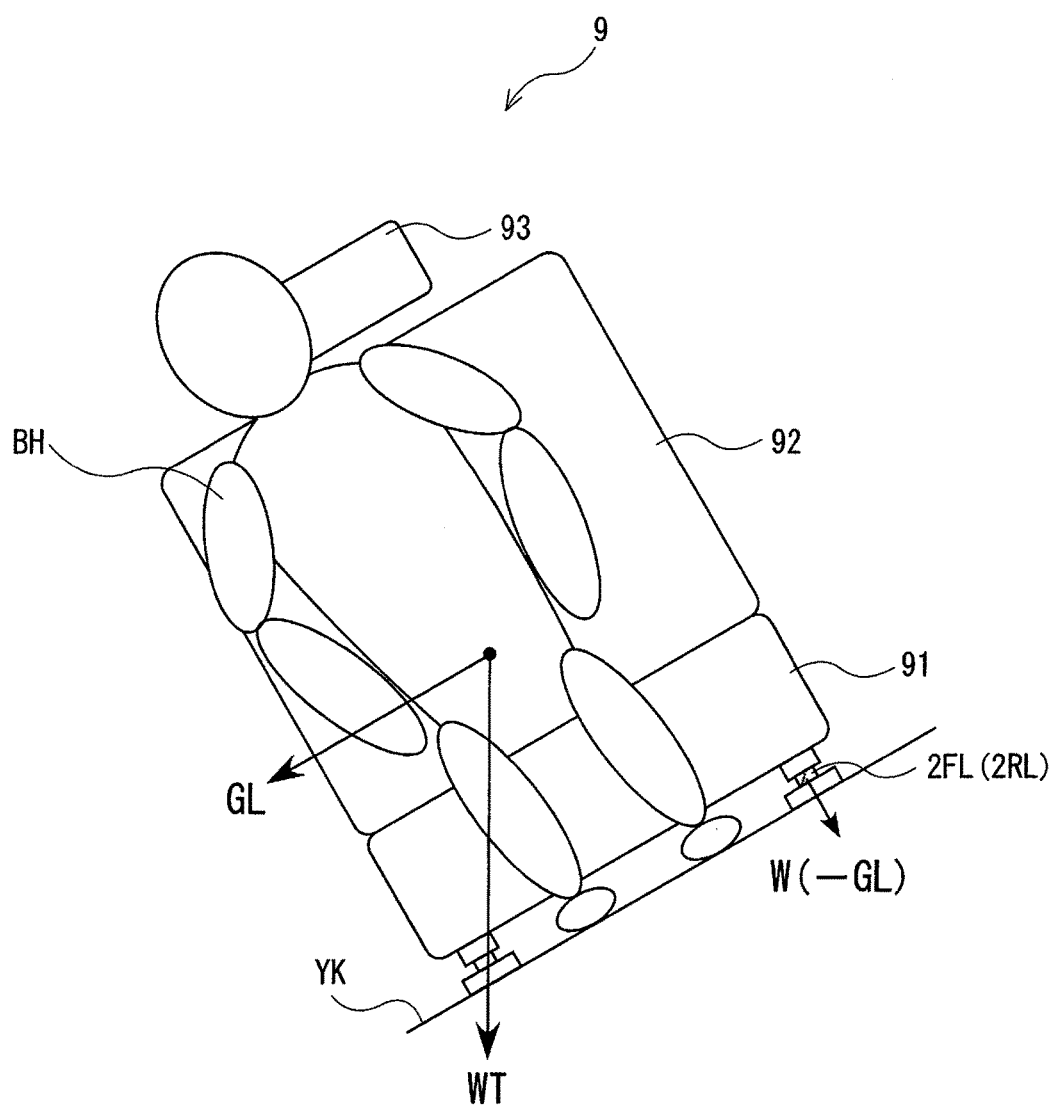
FIG. 3D is an elevation view schematically illustrating a condition that the vehicle seat is inclined.

Furthermore, as illustrated in FIG. 3D, when the vehicle seat 9 on which the occupant BH exists inclines to the right direction, the load sensor 2FL, 2RL detects the load W(-GL) that is smaller than the load W(0), as similar to the case illustrated in FIG. 3C. Incidentally, although the load W(-GL), which is generated in this case, and the load W(-GL) that occurs in the case illustrated in FIG. 3C have the identical numerals, it is not necessary that both loads W(-GL) are equal to each other.

Furthermore, although it is not shown in the drawings, when the vehicle seat 9 on which the occupant BH exists inclines to the left direction, the load sensor 2FL, 2RL detects the load W(+GL) that is greater than the load W(0), as similar to the case illustrated in FIG. 3B. Incidentally, the load W(+GL) which occurs in this case, and the load W(+GL) which occurs in the case illustrated in FIG. 3B have the identical numerals. However, it is not necessary that both loads W(+GL) are equal to each other.

Figure 4:
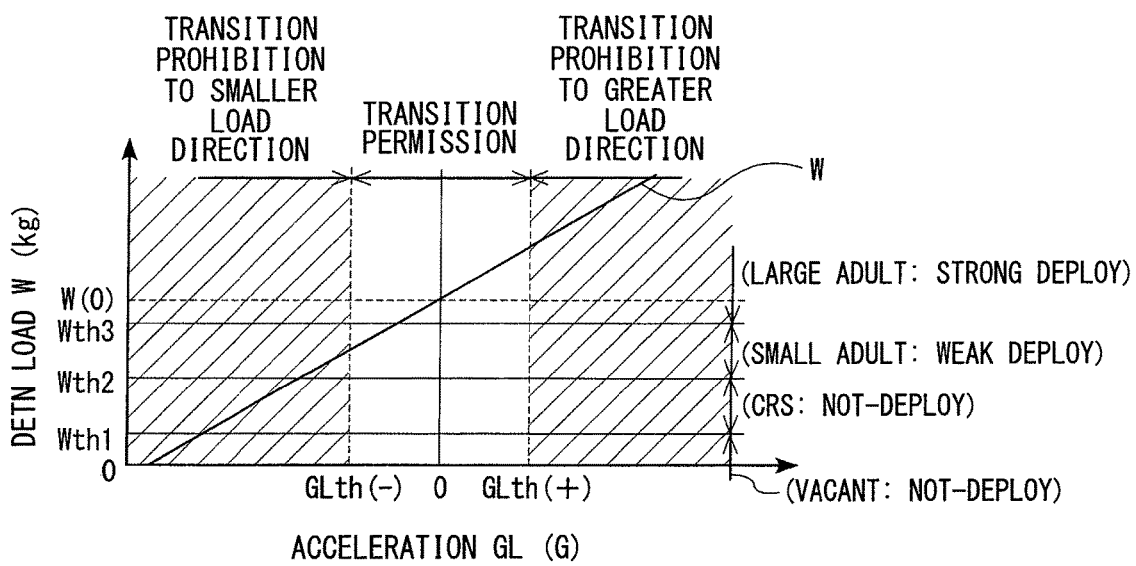
FIG. 4 is a diagram illustrating a map showing correlation between a detection load and acceleration determining an occupant type.
Figure 5A:
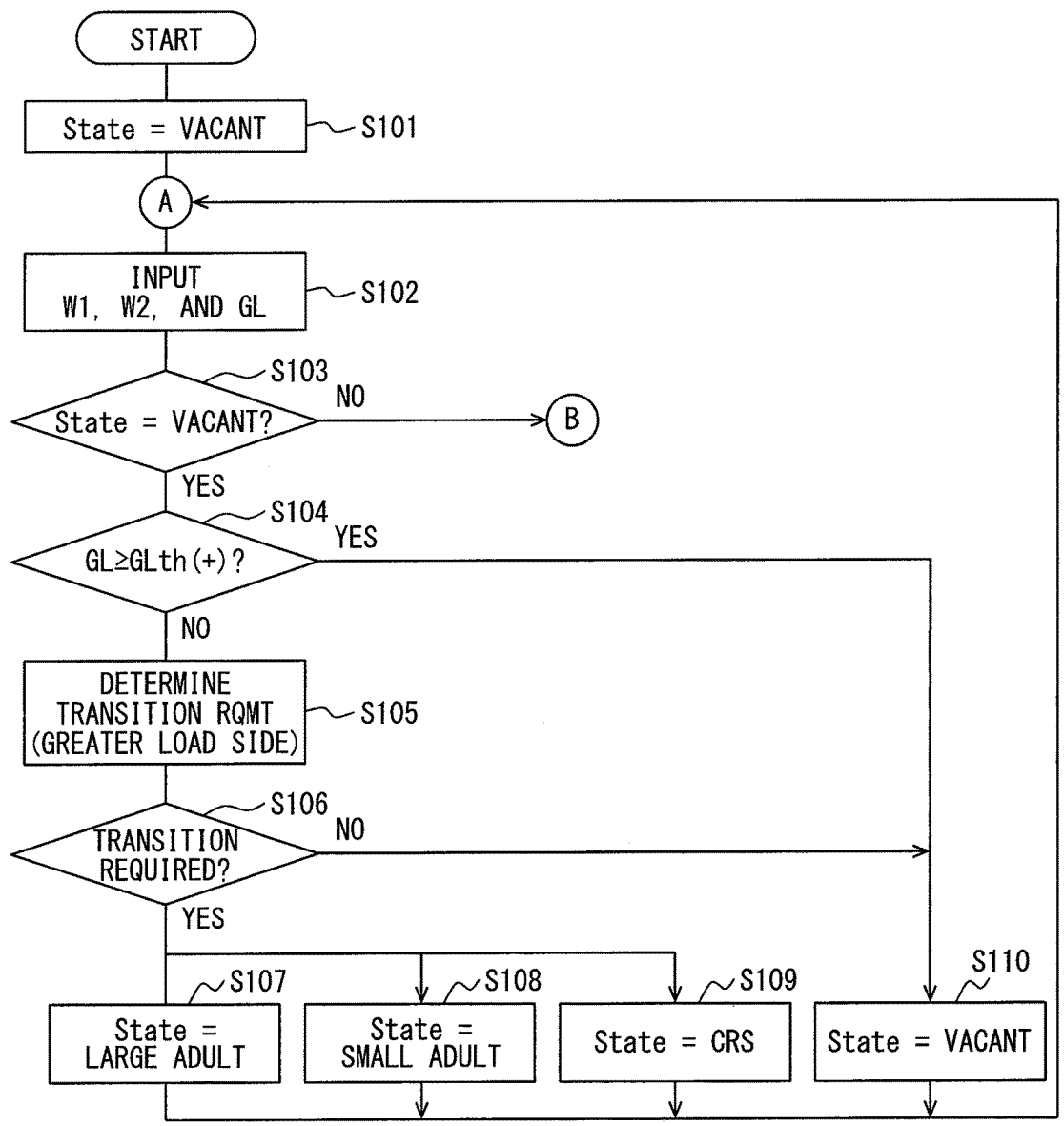
FIG. 5A is a control flowchart of the vehicular occupant determination apparatus and including a type determination flowchart at the time when a present determination result corresponds to be vacant.

The occupant determination portion 61 uses a map illustrated in FIG. 4, and determines the occupant type on the seat 9 based on the detected load W. Specifically, when the load W is less than a first load threshold Wth1, it is determined that the vehicle seat 9 corresponds to vacancy (also referred to as a vacant seat or being vacant). When the load W is equal to or greater than the first load threshold Wth1 and also is less than a second load threshold Wth2, it is determined that CRS is fixed on the vehicle seat 9. When the load W is equal to or greater than the second load threshold Wth2 and also is less than a third load threshold Wth3, it is determined that a small-sized adult sits on the vehicle seat 9. Incidentally, the small-sized adult may be referred to as a small adult in FIG. 4, FIG. 5A, and thereafter. When the load W is equal to or greater than the third load threshold Wth3, it is determined that a large-sized adult sits on the vehicle seat 9. The large-sized adult may be referred to as a large adult in FIG. 4, FIG. 5A, and thereafter. Incidentally, it should be noticed that the determination method of the occupant type explained above is an example. Any other determination method may be applicable when the present disclosure is performed. Incidentally, the small-sized adult and the large-sized adult may be referred to an adult together.

Figure 2:
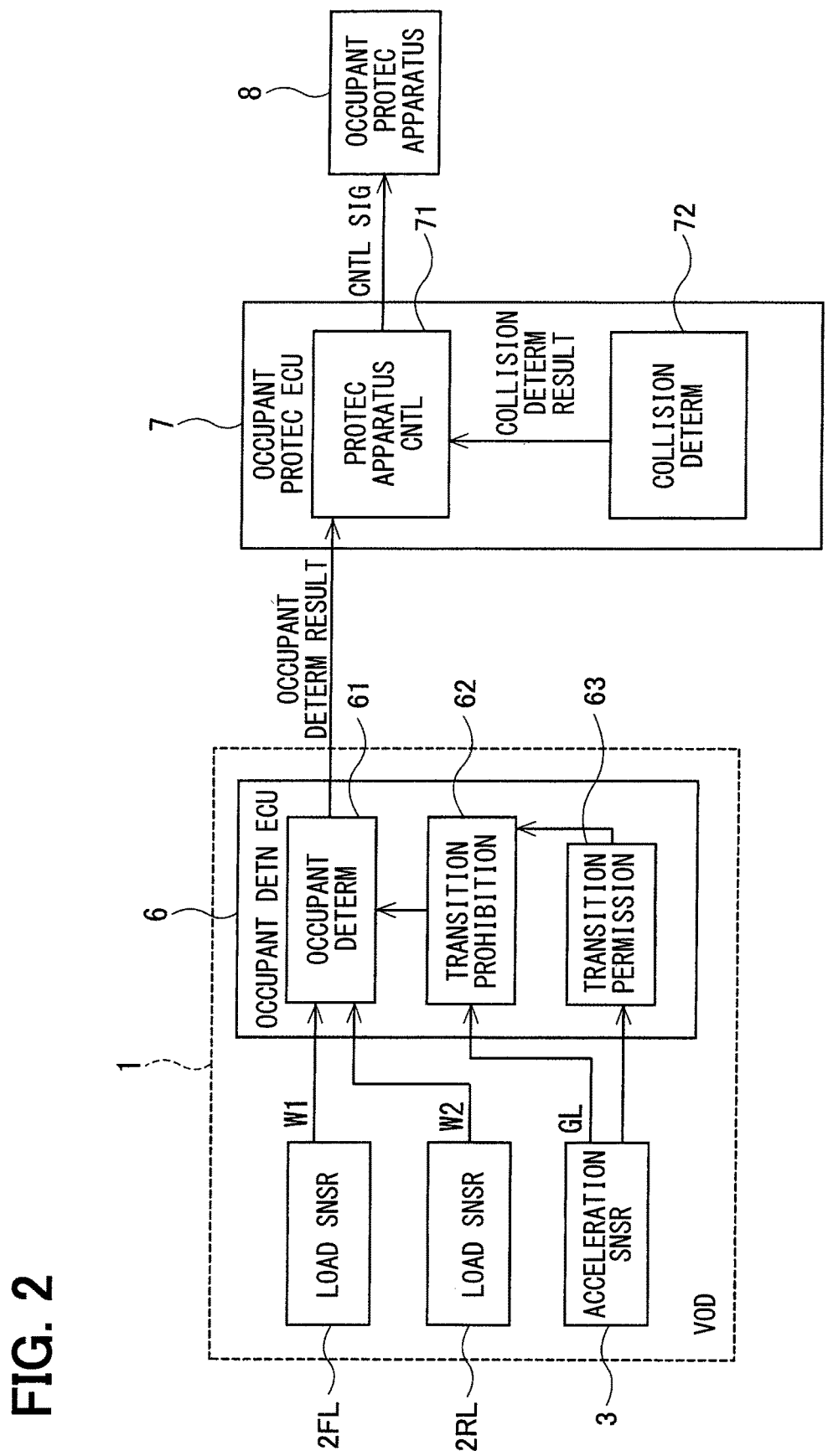
FIG. 2 is a block diagram of the vehicular occupant determination apparatus connected an occupant protection ECU.

As described in FIG. 2, the transition prohibition portion 62 is connected with the acceleration sensor 3. The transition prohibition portion 62 compares the acceleration GL detected by the acceleration sensor 3 with a predetermined left-direction acceleration threshold GLth(+) or a predetermined right-direction acceleration threshold GLth(−). Incidentally, in FIG. 4, a left-direction acceleration GL is expressed as a positive value, and a right-direction acceleration GL is expressed as a negative value. The left-direction acceleration threshold GLth(+) is a comparative threshold at the time when the detected acceleration GL is the acceleration to the left direction. The right-direction acceleration threshold GLth(−) is a comparative threshold at the time when the detected acceleration GL is the acceleration to the right direction. Hereinafter, by covering the left-direction acceleration threshold GLth(+) and the right-direction acceleration threshold GLth(−), these acceleration thresholds may be referred to as acceleration threshold GLth(+), GLth(−). The transition prohibition portion 62 sets a transition prohibition state when the detected positive value of the acceleration GL is equal to or greater than the left-direction acceleration threshold GLth(+) or when the detected negative value of the acceleration GL is equal to or less than the right-direction acceleration threshold GLth(−). In the transition prohibition state, the occupant determination portion 61 is prohibited from transiting the determination result of the occupant type. In FIG. 4, a region corresponding to the transition prohibition state is illustrated by hatching. Incidentally, an absolute value of the acceleration GL when the detected positive value of the acceleration GL is equal to or greater than the left-direction acceleration threshold GLth(+) or when the detected negative acceleration GL is equal to or less than the detected acceleration GLth(−) is equal to or greater than the acceleration threshold GLth(+), GLth(−). Therefore, the both cases correspond to a case where the acceleration is equal to or greater than the acceleration threshold.

The transition permission portion 63 is connected with the acceleration sensor 3. The transition permission portion 63 detects whether the acceleration GL detected by the acceleration sensor 3 increases or decreases the loads W1, W2 detected by the load sensor 2FL, 2RL. When the acceleration GL increases the loads W1, W2 during the transition prohibition state (that is, when the positive value of the acceleration GL is equal to or greater than the left-direction acceleration threshold GLth(+)), the transition permission portion 63 sets a transition permission state, so that a transition to a direction in which the loads W1, W2 decreases is permitted. The direction in which the loads W1, W2 decreases is also referred to as a smaller load side. The transition to the smaller load side may represent a transition of the determination result of one occupant type to another occupant type with having a smaller load than a load of the one occupant type. When the acceleration GL decreases the loads W1, W2 during the transition prohibition state (that is, when the negative value of the acceleration GL is equal to or less than the right-direction acceleration threshold GLth (−)), the transition permission portion 63 sets the transition permission state, so that a transition to a direction in which the loads W1, W2 increase is permitted. The direction in which the loads W1, W2 increase is also referred to as a greater load side. The transition to the greater load side may represent a transition of the determination result of one occupant type to another occupant type with having a greater load than a load of the one occupant type. Transition to the smaller load side includes a transition from the small-sized adult to CRS, or a transition from the small-sized adult to the vacancy, for example. The transition to the greater load side includes a transition from CRS to the small-seized adult, or a transition from CRS to the large-sized adult, for example. In the present embodiment, the loads W1, W2 increases in the order of the vacancy, CRS, the small-sized adult, and the large-sized adult.

(Configuration and Function of Occupant Protection ECU and Occupant Protection Apparatus)

The occupant protection ECU 7 is connected with the occupant detection ECU 6. The occupant protection ECU 7 is a control apparatus which is provided with an input-and-output apparatus, CPU, RAM, or the like, as similar to the occupant detection ECU 6. The occupant protection ECU 7 includes a protection apparatus control portion 71 (also referred to as a protection apparatus controller) and a collision determination portion 72. The protection apparatus control portion 71 is connected with the collision determination portion 72 and the occupant protection apparatus 8. The occupant protection apparatus 8 includes various types of airbag apparatus, a seatbelt pre-tensioner, or the like. The protection apparatus control portion 71 protects an occupant by operating the occupant protection apparatus 8 when the collision determination portion 72 has detected an occurrence of a collision of the vehicle VE.

The protection apparatus control portion 71 of the occupant protection ECU is connected with the occupant determination portion 61 of the occupant detection ECU 6. The protection apparatus control portion 71 selects an operation method of the airbag apparatus included in the occupant protection apparatus 8, based on the determination result of the occupant type by the occupant determination portion 61. Specifically, the airbag apparatus is not deployed when it is determined that the vehicle seat 9 is vacant, or when CRS is fixed on the vehicle seat 9. The airbag apparatus is deployed weakly when it is determined that the small-sized adult sets on the vehicle seat 9. In other words, the airbag apparatus is set to be a weak deployment state. The airbag apparatus is deployed strongly when it is determined that the large-sized adult sets on the vehicle seat 9. In other words, the airbag apparatus is set to be a strong deployment state.

(Control Method of Vehicular Occupant Determination Apparatus)

Hereinafter, a control method of the occupant determination apparatus 1 will be explained with reference to FIG. 5A to FIG. 5D. When the occupant determination apparatus 1 starts, the occupant determination portion 61 sets at S101 that the determination result of the occupant type on the vehicle seat 9 is vacant (also, referred to as a vacant seat or vacancy). At S102, the detected loads W1, W2 and the acceleration GL are inputted to, for example, the occupant detection ECU 6. At S103, it is determined whether the present determination result of the occupant type recognized by the occupant determination portion 61 corresponds to the vacant seat. When the present determination result is not the vacant seat (S103: NO), the processing shifts to S201 illustrated in FIG. 5B.

When the occupant determination portion 61 determines as the vacant seat presently, it is determined at S104 whether the detected acceleration GL is equal to or greater than the left-direction acceleration threshold GLth(+). The occupant determination 61 performs a determination of the occupant type to the greater load side on the vehicle seat 9 at S105 when the acceleration GL is less than the left-direction acceleration threshold GLth(+). At S106, it is determined whether the determination result is required to transit based on the executed determination result of the occupant type at this time. When the determination result of the occupant type is not required to transit (S106: NO), the determination result in which the vehicle seat 9 corresponds to the vacant seat is maintained (S110). By contrast, at S106, when it is determined that the determination result of the occupant type is required to transit, the determination result is transited, based on the detected load W, to the determination result which is newly determined of the occupant type (also referred to as a new determination result) from the determination result which shows the vehicle seat 9 corresponds to the vacant seat. Incidentally, a new transition destination of the determination result corresponds to any one of a case where the large-sized adult sets on the vehicle seat 9 (S107), a case where the small-sized adult sits on the vehicle seat 9 (S108), and a case where CRS is fixed on the vehicle seat 9 (S109).

At S104, when it is determined that the detected acceleration GL is equal to or greater than the left-direction acceleration threshold GLth(+), it is considered that the transition prohibition portion 62 sets the transition prohibition state and prohibits the determination result of the occupant type from transiting to the greater load side. Incidentally, when the occupant determination portion 61 determines that the present determination result of the occupant type corresponds to the vacant seat, the transition to the smaller load side, which should be permitted basically, does not exist. Therefore, the determination result that the vehicle seat 9 corresponds to the vacant seat is maintained (S110).

As described above, when the occupant determination portion 61 determines that the present determination result of the occupant type corresponds to the vacant seat, the transition to the smaller load side does not exist. Thus, it is unnecessary to determine whether the transition of the smaller load side is prohibited. Therefore, it is not determined whether the detected acceleration GL is equal to or less than the right-direction acceleration threshold GLth(−).

At S103, when the present determination result of the occupant type, which is recognized by the occupant determination portion 61, is not determined as the vacant seat (S103: NO), the processing shifts to S201. At S201, it is determined whether the large-sized adult sits on the vehicle seat 9. When it is determined that the large-sized adult sits on the vehicle seat 9, it is determined at S202 whether the detected acceleration GL is equal to or less than the right-direction acceleration threshold GLth(−). When the acceleration GL is greater than the right-direction acceleration threshold GLth(−), the occupant determination portion 61 determines the occupant type toward the smaller load side on the vehicle seat 9 at S203. And, at S204, based on the present determination result of the occupant type, which has been executed, it is determined whether the determination result is required to transit. When the determination result of the occupant type is not required to transit (S204: NO), the processing shifts to S208. At S208, the determination result that the large-sized adult sits on the vehicle seat 9 is maintained. By contrast, at S204, when it is determined that the determination result of the occupant type is required to transit (S204: YES), the process shifts to any one of S205, S206, and S207. That is, the determination result is transited, based on the detected load W, to the newly determined determination result of the occupant type from the determination result which shows the large-sized adult sits on the vehicle seat 9. Incidentally, the new transition destination of the determination result corresponds to any one of the case where the small-sized adult sits on the vehicle seat 9 (S205), the case where CRS is fixed on the vehicle seat 9 (S206), and the case where the vehicle seat 9 is vacant (S207).

At S202, when it is determined that the detected acceleration GL is equal to or less than the right-direction acceleration threshold GLth(−), it is considered that the transition prohibition portion 62 sets the transition prohibition state and prohibits the determination result of the occupant type from transiting to the smaller load side. Incidentally, when the occupant determination portion 61 determines that the present determination result of the occupant type shows that the large-sized adult sits on the vehicle seat 9, the transition to the greater load side, which is permitted basically, does not exist. Therefore, the determination result that the large-sized adult sits on the vehicle seat 9 is maintained (S208).

As described above, when the large-sized adult sits on the vehicle seat 9 at present, the transition to the greater load side does not exist. Thus, it is unnecessary to determine whether the transition of the greater load side is prohibited. Therefore, it is not determined whether the detected acceleration GL is equal to or greater than the left-direction acceleration threshold GLth(+).

At S201, when the present determination result of the occupant type, which is recognized by the occupant determination portion 61, is not determined that the large-sized adult sits on the vehicle seat 9 (S201: NO), the processing shifts to S301 illustrated in FIG. 5C. At S301, it is determined whether the present determination result of the occupant type recognized by the occupant determination portion 61 is a case where the small-sized adult sits on the vehicle seat 9. When it is determined that the small-sized adult sits on the vehicle seat 9, it is determined at S302 whether the detected acceleration GL is equal to or greater than the left-direction acceleration threshold GLth(+). When the acceleration GL is less than the left-direction acceleration threshold GLth(+), it is determined at S303 whether the detected acceleration GL is equal to or less than the right-direction acceleration threshold GLth(−). When the detected acceleration GL is greater than the right-direction acceleration threshold GLth(−) (S303: NO), the occupant determination portion 61 determines the occupant type on the vehicle seat 9 at S304. And, at S305, based on the present determination result of the occupant type, which has been executed, it is determined whether the determination result is required to transit. When the determination result of the occupant type is not required to transit, the determination result that the small-sized adult sits on the vehicle seat 9 is maintained (S313). By contrast, at S305, when it is determined that the determination result of the occupant type is required to transit (S305: YES), the process shifts to any one of S310, S311, and S312. That is, the determination result is transited, based on the detected load W, to the newly determined determination result of the occupant type from the determination result which shows the small-sized adult sits on the vehicle seat 9.

At S302, when it is determined that the detected acceleration GL is equal to or greater than the left-direction acceleration threshold GLth(+), the transition prohibition portion 62 sets the transition prohibition state, so that the transition of the determination result of the occupant type is prohibited. In addition, the transition permission portion 63 permits the transition to the smaller load side, so that the occupant determination portion 61 determines the occupant type to the smaller load side (S308). And, at S309, based on the present determination result of the occupant type, which has been executed, it is determined whether the determination result is required to transit. When the determination result of the occupant type is not required to transit, the determination result that the small-sized adult sits on the vehicle seat 9 is maintained (S313). By contrast, when it is determined that the determination result of the occupant type is required to transit (S309: YES), the process shifts to either of S310 or S311. That is, the determination result is transited, based on the detected load W, to the newly determined determination result of the occupant type from the determination result which shows the small-sized adult sits on the vehicle seat 9. In this case, the new transition destination of the determination result corresponds to any one of the case where CRS is fixed on the vehicle seat 9 (S310), and the case where the vehicle seat 9 is vacant (S311).

At S303, when it is determined that the detected acceleration GL is equal to or less than the right-direction acceleration threshold GLth(−), the transition prohibition portion 62 sets the transition prohibition state, so that the transition of the determination result of the occupant type, which is performed by the occupant determination portion 61, is prohibited. In addition, the transition permission portion 63 permits the transition to the greater load side, so that the occupant determination portion 61 determines the occupant type toward the greater load side (S306). After S306, at S307, based on the determination result of the occupant type, which has been executed at this time, it is determined whether the determination result is required to transit. When the determination result of the occupant type is not required to transit, the determination result that the small-sized adult sits on the vehicle seat 9 is maintained (S313). By contrast, when it is determined that the determination result of the occupant type is required to transit (S307: YES), the processing shifts to S312. At S312, the determination result is transited to the determination result that the large-sized adult sits on the vehicle seat 9.

Figure 5B:
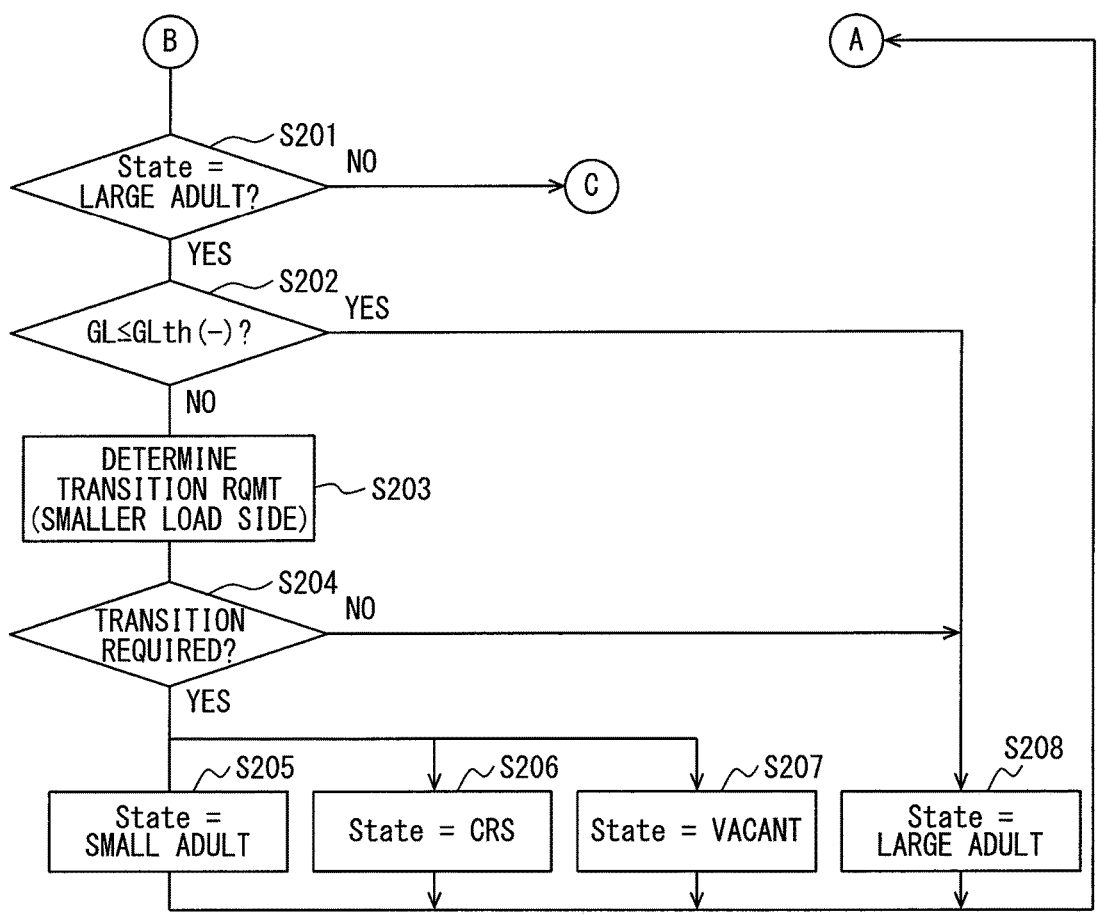
FIG. 5B is a diagram illustrating a type determination flowchart at the time when the present determination result corresponds to a large-sized adult.
Figure 5C:
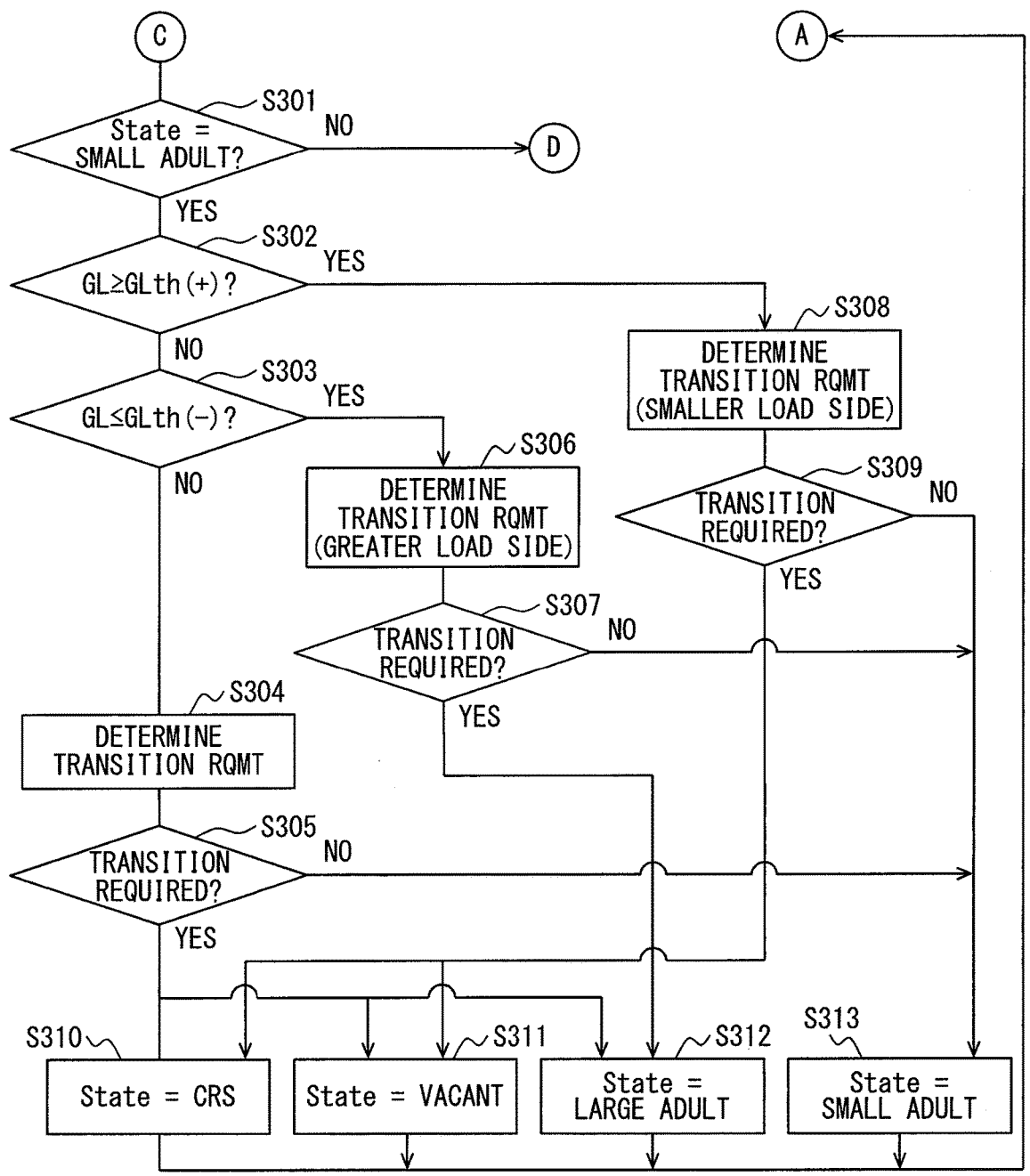
FIG. 5C is a diagram illustrating a type determination flowchart at the time when the present determination result corresponds to a small-sized adult.
Figure 5D:
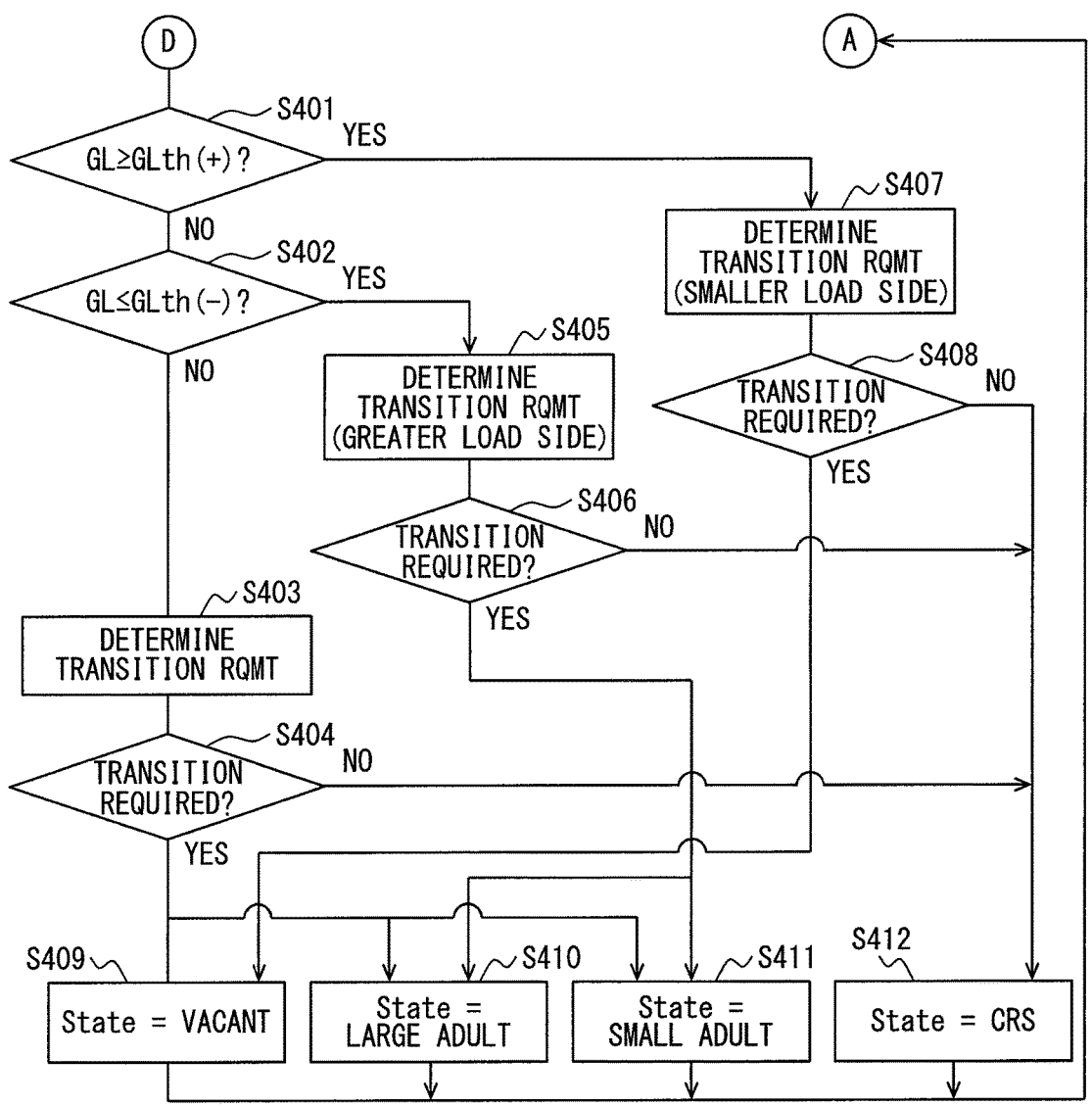
FIG. 5D is a diagram illustrating a type determination flowchart at the time when the present determination result corresponds to a CRS fixed state.

At S301, when the present determination result of the occupant type, which is recognized by the occupant determination portion 61, is not determined that the small-sized adult sits on the vehicle seat 9, the processing shifts to S401 illustrated in FIG. 5D. When the present determination result of the occupant type, which is recognized by the occupant determination portion 61, corresponds to the case where CRS is fixed on the vehicle seat 9, the determination of the occupant type illustrated in a flowchart of FIG. 5D is executed, as similar to a case of FIG. 5C. As illustrated in FIG. 5D, the flowchart illustrated in FIG. 5D is similar to the flowchart of FIG. 5C. Thus, a detailed explanation will be omitted.

According to the present embodiment, when the acceleration GL detected by the acceleration sensor 3 is equal to or greater than a predetermined left-direction acceleration threshold GLth(+), the transition prohibition portion 62 sets the transition prohibition state in which the determination result of the occupant type performed by the occupant determination portion 61 is prohibited. Similarly, the transition prohibition portion 62 sets the transition prohibition state when the detected acceleration GL is equal to or less than a predetermined right-direction acceleration GLth(−). Accordingly, when the vehicle VE is driving turningly or when the vehicle VE stops inclined in the vehicle width direction, the transition prohibition portion 62 sets the transition prohibition state. Thus, even when the occupant position or the occupant posture on the vehicle seat 9 changes, it may be possible to prevent an erroneous determination in which the occupant type has changed.

According to the present embodiment, the transition permission portion 63 sets the transition permission state in which the transition to the smaller load side is permitted when the acceleration GL increases the load W during the transition prohibition state, or the transition to the greater load side is permitted when the acceleration GL decreases the load W during the transition prohibition state. Accordingly, the transition toward a state where it is less likely affected by an occurrence of the acceleration GL is permitted such as a direction toward the smaller load side in a case where the acceleration GL increases the load W, another direction toward the greater load side in a case where the acceleration GL decreases the load W. Thus, it may be possible to detect a change of the occupant type and to transit the determination result to the actual determination result of the occupant type as early as possible when the determination result changes to the proper determination result with taking a time during driving of the vehicle VE, or when the occupant has a seat or leaves a seat in the vehicle during driving.

Since the acceleration GL occurs in the vehicle VE, the occupant type on the vehicle seat 9 may not be determined exactly in some cases. However, it may be possible to determine that a small-sized adult sit on a vehicle seat when a large-sized adult sits on the vehicle seat, so that it may be possible to determine the occupant type which is adjacent to a proper occupant type. An airbag apparatus deploys in both of a case where it is determined that a large-sized adult sits on the vehicle seat and another case where it is determined a small-sized adult sits on the vehicle seat. Thus, there may be no difficult in an operation of the occupant protection apparatus 8. In the present embodiment, adjacent occupant types for the determination result of the small-sized adult correspond to the determination result of the large-sized adult and the determination result of CRS, for example.

Modified Example of Embodiment

Figure 6:
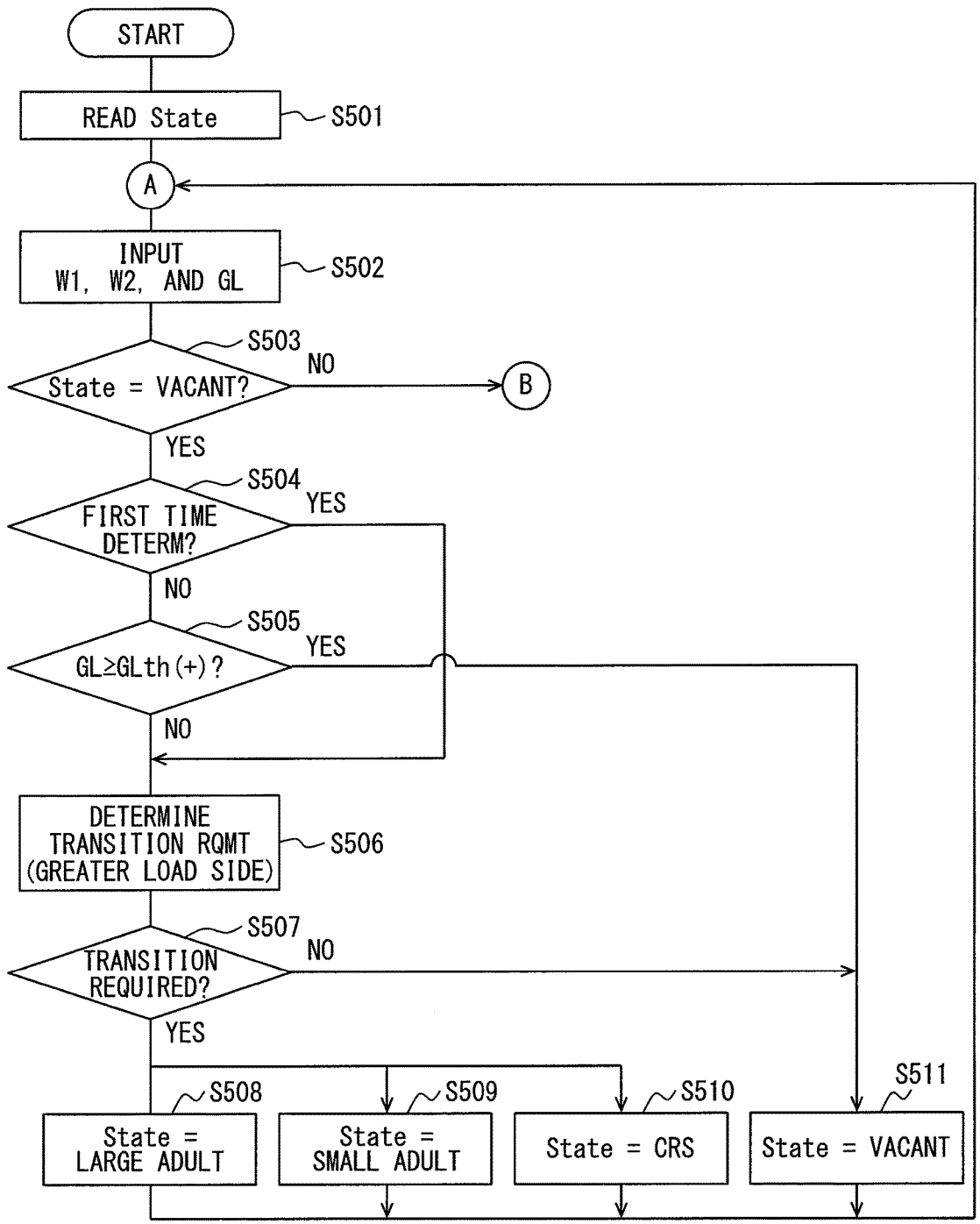
FIG. 6 is a control flowchart of a vehicular occupant determination apparatus of a modified example and including a type determination flowchart at the time when the present determination result corresponds to be vacant.

A configuration of a modified example of the present embodiment will be explained with reference to FIG. 6 and FIG. 7. In this example, it is supposed that the present determination result of the occupant type recognized by the occupant determination portion 61 corresponds to a case where the vehicle seat is vacant or a case where the small-sized adult sits on the vehicle seat. Incidentally, this modified example includes the occupant determination apparatus 1 and the vehicle seat 9 which are similar to the above described embodiment. In the modified example, the transition prohibition portion 62 does not set the transition prohibition state even when the acceleration GL detected by the acceleration sensor 3 is equal to or greater than the left-direction acceleration threshold GLth(+) in a case where the determination of the occupant type is the first time after starting the occupant determination apparatus 1. In addition, the transition prohibition portion 62 does not set the transition prohibition state even when the acceleration GL detected by the acceleration sensor 3 is equal to or less than the right-direction acceleration threshold GLth(−) in a case where the determination of the occupant type is the first time after starting the occupant determination apparatus 1. This feature is different from the above described embodiment.

Hereinafter, the modified example will be explained in detail. The occupant determination portion 61 of the modified example stores the determination result of the occupant type at the time when an ignition switch of the vehicle VE turns off and electric power supply to the occupant determination apparatus 1 stops. Then, as described in FIG. 6, at S501, the occupant determination apparatus 1 reads out the stored determination result of the occupant type when the ignition switch of the vehicle VE turns on and the occupant determination apparatus 1 starts up. At S502, the detected loads W1, W2 and the acceleration GL are inputted to, for example, the occupant detection ECU 6. At S503, it is determined whether the present determination result of the occupant type, which is recognized by the occupant determination potion 61, shows that the vehicle seat 9 is vacant. At S504, it is determined whether the determination of the occupant type at this time is the first time after starting the occupant determination apparatus 1. To determine whether the determination of the occupant type at this time is the first time corresponds to a determination state of the occupant type or corresponds to a determination history. Incidentally, the determination of the occupant type at this time represents a determination of the occupant type to be performed, which will be described below. Regarding whether the determination of the occupant type is the first time, a single determination of the occupant type is formed by multiple cycles of a routine illustrated in FIG. 6, based on multiple loads W1, W2 which have been detected. Thus, at S504, it is determined whether a determination of the occupant type performed after multiple cycles of the routine illustrated in FIG. 6 is the first time after the occupant determination apparatus 1 starts up. It is supposed that the determination of the occupant type at this time is the first time after starting the occupant determination apparatus 1. In this case, without comparing the acceleration GL and the left-direction acceleration threshold GLth(+), the occupant determination portion 61 determines the occupant type on the vehicle seat 9 (S506). By contrast, it is supposed that the determination of the occupant type at this time is not the first time after starting the occupant determination apparatus 1. In this case, similar to the flowchart illustrated in FIG. 5A, it is determined at S505 whether the detected acceleration GL is equal to or greater than a predetermined left-direction acceleration threshold GLth(+). In the flowchart illustrated in FIG. 6, steps except for the above steps is substantially similar to the steps illustrated in FIG. 5A, and thus, further explanation will be omitted.

Figure 7:
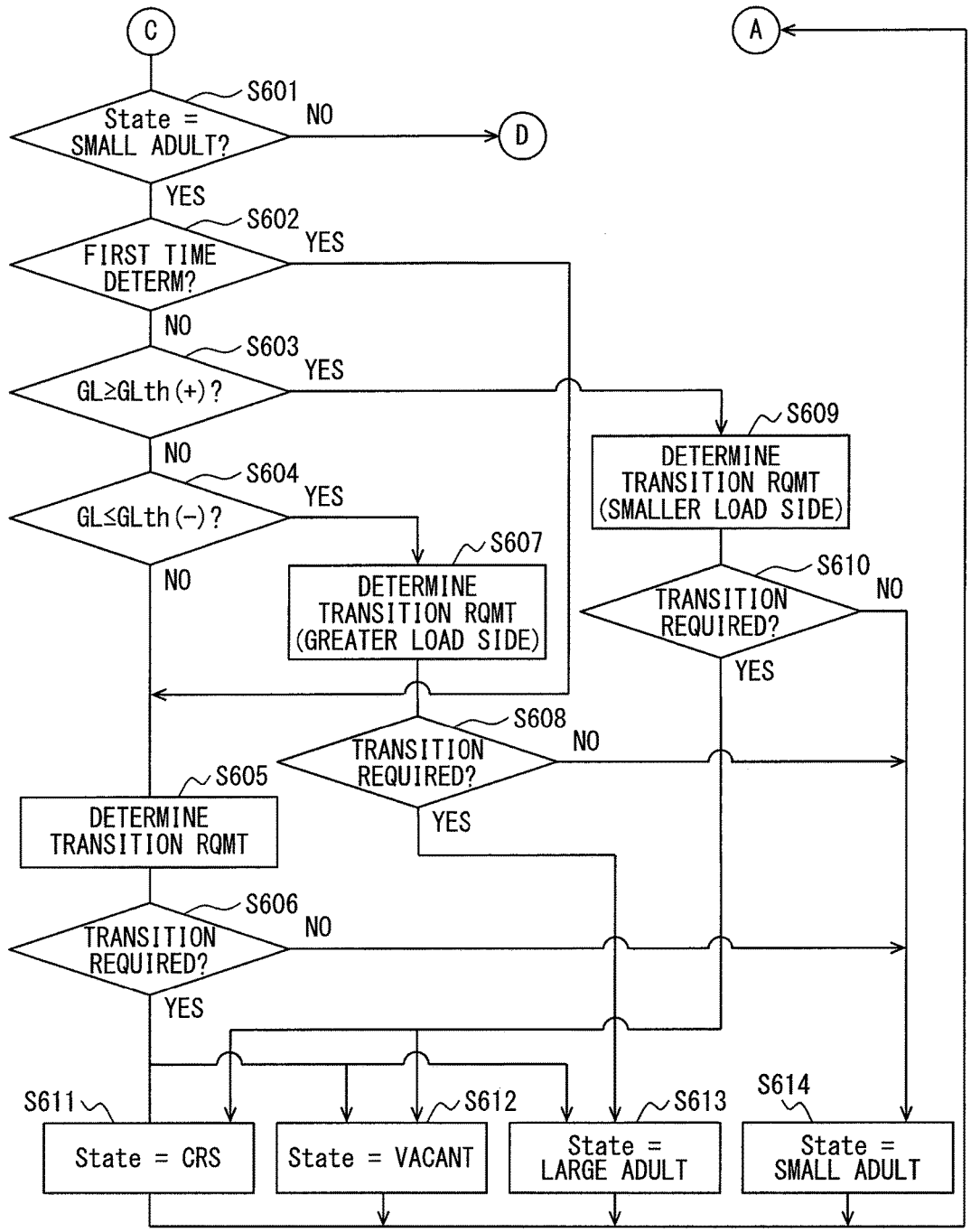
FIG. 7 is a diagram illustrating a type determination flowchart at the time when the present determination result corresponds to a small-sized adult in a vehicular occupant determination apparatus of the modified example.

As illustrated in FIG. 7, it is supposed that the present determination result of the occupant type, which is recognized by the occupant determination portion 61, corresponds to a case where the small-sized adult sits on the vehicle seat (S601). In this case, as similar to the above described cases, it is determined at S602 whether the determination of the occupant type at this time is the first time after starting the occupant determination apparatus 1. It is supposed that the determination of the occupant type at this time is the first time after starting the occupant determination apparatus 1. In this case, without comparing the acceleration GL and the acceleration threshold GLth(+), GLth(−), the occupant determination portion 61 determines the occupant type on the vehicle seat 9 at S605. It is supposed that the determination of the occupant type at this time is not the first time after starting the occupant determination apparatus 1. In this case, similar to the flowchart illustrated in FIG. 5C, it is determined at S603 and S604 whether the detected acceleration GL is equal to or greater than the predetermined left-direction acceleration threshold GLth(+) and is equal to or less than the right-direction acceleration threshold GLth(−).

In the flowchart illustrated in FIG. 7, steps except for the above steps is substantially similar to the steps illustrated in FIG. 5C, and thus, further explanation will be omitted.

In this modified example, when the present determination result of the occupant type, which is recognized by the occupant determination portion 61, shows that the large-sized adult sits on the vehicle seat, a control of the occupant determination apparatus 1 is executed according to a flowchart in which the steps of FIG. 5B are changed as similar to the above described case. In this modified example, when the present determination result of the occupant type, which is recognized by the occupant determination portion 61, shows that CRS is fixed on the vehicle seat 9, a control of the occupant determination apparatus 1 is executed according to a flowchart in which the steps of FIG. 5D are changed as similar to the above described case.

According to this modified example, the transition prohibition portion 62 does not set the transition prohibition state even when the acceleration GL detected by the acceleration sensor 3 is equal to or greater than the left-direction acceleration threshold GLth(+) in a case where the determination of the occupant type is the first time after starting the occupant determination apparatus 1. The transition prohibition portion 62 does not set the transition prohibition state even when the acceleration GL detected by the acceleration sensor 3 is equal to or less than the right-direction acceleration threshold GLth(−) in a case where the determination of the occupant type is the first time after starting the occupant determination apparatus 1. In a determination routine of the occupant type, an initial setting after starting the occupant determination apparatus 1 is set to a determination result stored at the time when the electric power supply to the occupant determination apparatus 1 stops. Thus, when the transition prohibition state is set in the determination of the occupant type at the first time after starting the occupant determination apparatus 1, a determination result of the occupant type which is greatly different from an actual occupant type regarding a state of the load W may keep for a long time. By contrast, in this modified example, since the transition prohibition state is not set in a case where the determination of the occupant type at this time is the first time after starting the occupant determination apparatus 1, it may be possible to determine the occupant type which is near to the actual occupant type.

As described above, in this modified example, the transition prohibition portion 62 determines whether the transition prohibition state is set according to the determination state of the occupant type. Accordingly, it may be possible to provide flexibility regarding whether the determination result of the occupant type is transited. Therefore, it may be possible to prevent the determination result of the occupant type from being greatly different from the actual determination result of the occupant type.

Other Embodiment

It should be noticed that the present disclosure is not limited to the described embodiment. The present disclosure may be modified or expanded as follows.

In the occupant determination apparatus 1 of the present disclosure, a total number of the load sensor 2FL, 2RL provided to the vehicle seat 9 is not limited. As long as the load sensor 2FL, 2RL is provided at either of the right portion or the left portion of the seat cushion 91, an attachment position may be selected according to a situation.

Another load sensor which is not used in the determination of the occupant type may be provided at a side which is opposite in a left-and-right direction to the load sensor 2FL, 2RL for determining the occupant type in the vehicle seat 9.

The occupant detection ECU 6 may be integrally formed with the occupant protection ECU 7. In forming integrally them, the acceleration sensor 3 may be used as an acceleration sensor which detects a collision and is provided to the occupant protection ECU 7.

An acceleration sensor 3 detecting the left-direction acceleration and an acceleration sensor 3 detecting the right-direction acceleration may be separately provided in the vehicle VE. Based on which of the acceleration sensor 3 detects the acceleration GL, a direction of the acceleration GL may be determined. In this case, both of the left-direction acceleration GL and the right-direction acceleration GL are positive values, and each of the transition prohibition state and the transition permission state is set when either of the accelerations GL is equal to or greater than an acceleration threshold.

A part or all of functions executed by the occupant detection ECU 6 may be configured by, for example, one or multiple integrated circuits (ICs) or the like in a hardware manner.

The occupant determination apparatus 1 of the present disclosure may be applied to a warning apparatus which alerts an occupant at the time when the seatbelt apparatus 95 is not worn.

Incidentally, the large-sized adult may be a male, which can be represented in testing by a AM50 (including Hybrid III 50th) dummy or may be a person having a body weight of an American male adult positioned at 50% of the population (that is, an average body weight) in the normal distribution of the body weights of American male adults, for example. The small-sized adult may be a female, which can be represented in testing by a AF05 (including Hybrid III 5th) dummy or may be a person having a body weight of an American female adult positioned at 5% of a population from the lightest weight side in the normal distribution of the body weights of American female adults, for example. It should be noticed that the large-sized adult and the small-sized adult may be defined arbitrarily.

It is noted that a flowchart or the process of the flowchart in the present application includes steps (also referred to as sections), each of which is represented, for instance, as S101. Further, each step can be divided into several sub-steps while several steps can be combined into a single step.

While the embodiments, the configurations, the aspects of the vehicular occupant determination apparatus have been described by way of example, it should be appreciated that embodiments, configurations, aspects of the present disclosure are not limited to the respective embodiments, the respective configurations, and the respective aspects described above. For example, embodiments, configurations, aspects obtained by appropriately combining technical portions disclosed in different embodiments, configurations, and aspects are included within a range of embodiments, configurations, and aspects of the present disclosure.

What is claimed is:

1. A vehicular occupant determination apparatus comprising:
    a load detector that detects a load of either a left part or a right part of a seat portion of a vehicle seat in a vehicle;
    an acceleration detector that detects an acceleration in a width direction of the vehicle; and
    a controller configured to perform:
        an occupant determination portion that determines any one of occupant types on the vehicle seat based on the load detected by the load detector, and maintains or transits a determination result of the occupant types;
        a transition prohibition portion that sets a transition prohibition state when the acceleration is equal to or greater than a predetermined acceleration threshold, wherein the determination result of the occupant types is prohibited to transit in the transition prohibition state; and
        a transition permission portion that
            detects whether the acceleration increases or decreases the load, and
            sets a transition permission state even during the transition prohibition state, wherein in the transition permission state, the determination result of a first occupant type is permitted to transit to the determination result of a second occupant type with a smaller load than the load of the first occupant type when the acceleration increases the load, and the determination result of the first occupant type is permitted to transit to the determination result of a third occupant type with a greater load than the load of the first occupant type when the acceleration decreases the load, the occupant types include the first occupant type, the second occupant type, and the third occupant type.

2. The vehicular occupant determination apparatus according to claim 1, wherein:
    the transition prohibition portion determines whether the transition prohibition state is set or not based on a determination state of the occupant types.

3. The vehicular occupant determination apparatus according to claim 2, wherein:
    the transition prohibition portion does not set the transition prohibition state when the occupant determination portion determines the occupant types for a first time, even when the acceleration is equal to or greater than the acceleration threshold.

4. The vehicular occupant determination apparatus according to claim 3, wherein:
    the occupant determination portion outputs the determination result of the occupant types to a protection apparatus controller that controls a protection apparatus; and
    the occupant types includes an adult, a child restraint system, and a vacant seat.

* * * * *